United States Patent Office 2,931,785
Patented Apr. 5, 1960

2,931,785

NITROSO-AMINES AS ANTI-EXPOSURE AGENTS IN VULCANIZED BUTADIENE-STYRENE RUBBER

David J. Beaver, Richmond Heights, and Paul J. Stoffel, St. Louis, Mo., assignors to Monsanto Chemical Company, St. Louis, Mo., a corporation of Delaware No Drawing. Application April 23, 1956
Serial No. 579,765

4 Claims. (Cl. 260—45.9)

This invention relates to anti-exposure cracking agents for sulfur-vulcanizable rubbers and to rubber vulcanizates containing same.

One of the major problems of the rubber industry is the protection of vulcanizates of sulfur-vulcanizable rubbers against exposure cracking, that is degradation of the vulcanizate due to ozone while under static or dynamic stress. The problem is a serious one, particularly with respect to the service life of rubber tires, and is aggravated by the fact that in general chemical antioxidants have little or no value in protecting vulcanizates against deterioration by ozone. Although many and varied substances have been suggested and tried, not one has been found entirely satisfactory. Accordingly, rubber technologists have constantly sought improvements.

In accordance with this invention it has been found that compounds possessing the structure $$R-\underset{\underset{R'}{|}}{N}-\overset{NO}{}$$

where R is a lower alkoxy substituted aryl radical and R' is an aliphatic hydrocarbon which may be substituted are an effective group of anti-exposure cracking agents. Examples of R are p-phenetyl and p-methoxyphenyl and examples of R' are methyl, ethyl, propyl, isopropyl, butyl, amyl, hexyl, cyclohexyl, and octyl radicals.

As illustrative of the anti-exposure cracking properties of the compounds of this invention, natural rubber compositions were prepared as follows:

| Stock | A | B |
|---|---|---|
| | Parts by weight | |
| Smoked sheets rubber | 100 | 100 |
| Carbon black | 50 | 50 |
| Saturated hydrocarbon softener | 3 | 3 |
| Zinc oxide | 5 | 5 |
| Stearic acid | 3 | 3 |
| Sulfur | 2.5 | 2.5 |
| N-Cyclohexyl 2-benzothiazolesulfenamide | 0.5 | 0.5 |
| Anti-exposure cracking agent | | 1.5 |

The ingredients were admixed on a rubber mill in the customary fashion and the respective compounded stocks cured in a press at 144° C. for 45 minutes. Since evaluation under static conditions is not indicative of the service obtained with many types of rubber articles which must withstand flexing, the vulcanized compositions were evaluated under dynamic conditions in an atmosphere containing a definite concentration of ozone. The test was carried out in the following manner: Samples of the stocks are cured in the form of a belt ½" wide, ¼" thick and 5 5/16" diameter and mounted on 1" diameter shafts. The ozone concentration is maintained at 20-30 parts per hundred million throughout the test and the shafts are rotated at 75 r.p.m. In this manner a momentary elongation through a range of 0-20% is provided at any portion of the test specimen passing over the shaft. (The apparatus and procedure employed are described in Analytical Chemistry, vol. 25, page 241, February 1953.) The experimental test specimens were compared visually at various intervals noting the extent of cracking. A stock which is severely cracked has no service life remaining in terms of the useful life of a rubber article and where the cracking is designated as extremely severe the degradation is well beyond even this point. The results of the tests are set forth below employing N-ethyl N-nitroso p-phenetidine, Mann and Haworth, J. Chem. Soc. 1944, page 673, as the anti-exposure cracking agent:

Table I

| Anti-Exposure Cracking Agent | Surface cracking after flexing in Ozone for— | | |
|---|---|---|---|
| | 12 Hrs. | 24 Hrs. | 48 Hrs. |
| None (Stock A) | v. slight | slight | moderate. |
| N-Ethyl-N-nitroso-p-phenetidine (Stock B) | none | none | none. |

The new compounds of this invention are particularly useful in the control of exposure cracking of the sulfur-vulcanizable synthetic rubber-like materials prepared by the polymerization of a conjugated diene compound, either alone or with other unsaturated compounds copolymerizable therewith. The synthetic rubbers which may be substantially improved in ozone resistance are polymers of the aliphatic conjugated diene compounds such as butadiene, isoprene, piperylene, dimethyl butadiene, ethyl butadiene, and the like either alone or with monoolefinic compounds which contain the $CH_2=C$ group such as the vinyl aromatics, namely styrene, α-methyl styrene, nuclear substituted styrenes, monochlorstyrene, dichlorstyrene, divinyl benzene, vinyl naphthalene, vinyl biphenyl, vinyl carbazole, 2-vinyl-5-ethyl pyridine, etc., and such vinyl compounds as acrylonitrile, methacrylonitrile, acrylic acid, methacrylic acid and esters thereof, methyl vinyl ketone and the like.

As illustrative of the control of exposure cracking of vulcanized sulfur-vulcanizable synthetic rubber-like materials, a rubbery butadiene-1,3-styrene copolymer composition is prepared utilizing the following ingredients:

| Stock | C | D |
|---|---|---|
| | Parts by weight | |
| GR-S X-761 | 100 | 100 |
| Carbon black | 50 | 50 |
| Saturated hydrocarbon softener | 10 | 10 |
| Zinc oxide | 4 | 4 |
| Stearic acid | 2 | 2 |
| Sulfur | 1.75 | 1.75 |
| N-Cyclohexyl 2-benzothiazolesulfenamide | 1.2 | 1.2 |
| Anti-exposure cracking agent | | 1.5 |

The ingredients were admixed on a rubber mill in the customary fashion and the respective compounded stocks cured in a press at 144° C. for 60 minutes. The vulcanizates were then evaluated for cracking resistance as aforedescribed. The results of the tests are set forth below:

Table II

| Anti-Exposure Cracking Agent | Surface Cracking After Flexing in Ozone for— | | | |
|---|---|---|---|---|
| | 12 Hrs. | 24 Hrs. | 36 Hrs. | 48 Hrs. |
| None (Stock C) | slight | moderate | severe | extremely severe. |
| N-Ethyl-N-nitroso-p-phenetidine (Stock D) | none | none | v. slight | v. slight. |

It is obvious from the foregoing that the compounds of this invention increase the life of natural and synthetic rubber goods.

By the terms "vulcanized rubber" and "sulfur-vulcanizable rubber" as employed in the appended claims, unless otherwise modified, is meant natural as well as synthetic rubbers which are capable of vulcanization when heated with sulfur and includes latices and reclaims of such materials.

It is to be understood that other desired filling and compounding ingredients may be incorporated in the rubber base along with the anti-exposure cracking agent. For example, there may be incorporated other accelerators, softeners, etc. as well as the customary rubber antioxidants.

Smaller amounts of the anti-exposure cracking agents may be employed than those indicated in the examples. Amounts as small as 0.5% by weight on the rubber (natural and synthetic) of the compounds of this invention exhibit significant anti-exposure cracking properties. Amounts higher than those specifically shown, as for example 5% by weight on the rubber, may be employed depending upon the nature of the rubber, the other compounding ingredients used and the objectives of the compounder.

It is intended to cover all changes and modifications of the examples of the invention herein chosen for purposes of disclosure which do not constitute departures from the spirit and scope of the invention.

What is claimed is:

1. A vulcanized butadiene-styrene rubber composition containing an anti-exposure cracking amount of a compound of the structure

where R represents a lower alkyl group and R' represents a radical selected from the group of alkyl radicals of 1–8 carbon atoms and cyclohexyl.

2. A vulcanized butadiene-styrene rubber composition containing an anti-exposure cracking amount of a compound of the structure

where R represents an alkyl radical of 1–2 carbon atoms and R' represents an alkyl radical of 1–8 carbon atoms.

3. A vulcanized butadiene-styrene rubber composition containing an anti-exposure cracking amount of N-ethyl-N-nitroso-p-phenetidine.

4. A vulcanized butadiene-styrene rubber composition containing an anti-exposure cracking amount of N-cyclohexyl-N-nitroso-p-phenetidine.

References Cited in the file of this patent

UNITED STATES PATENTS

| | | |
|---|---|---|
| 2,095,921 | Clifford | Oct. 12, 1937 |
| 2,109,164 | Clifford | Feb. 22, 1938 |